United States Patent [19]

Lin

[11] Patent Number: 4,846,644

[45] Date of Patent: Jul. 11, 1989

[54] WHIRLPOOL TYPE HIGH SPEED COOLER FOR PLASTIC GRAINS

[76] Inventor: Ping-Ho Lin, No. 19, Lane 306, Chung Cheng South Rd., Yung Kang Hsiang, Tainan Hsien, Taiwan

[21] Appl. No.: 212,637

[22] Filed: Jun. 28, 1988

[51] Int. Cl.$^4$ .................................................. B29B 9/02
[52] U.S. Cl. ........................................ 425/67; 264/142; 425/313
[58] Field of Search ............... 425/67, 71, 294, 306, 425/307, 68, 70, 310–314; 261/112.1; 264/142

[56] References Cited

U.S. PATENT DOCUMENTS

| | | | |
|---|---|---|---|
| 3,164,644 | 1/1965 | DeGhetto et al. | 261/112.1 X |
| 3,620,510 | 11/1971 | Longcore | 261/112.1 X |
| 3,892,834 | 7/1975 | Pritchard | 264/142 |
| 4,123,207 | 10/1978 | Dudley | 425/67 |
| 4,245,972 | 1/1981 | Anders | 425/67 |
| 4,401,421 | 8/1983 | Anders | 264/142 X |
| 4,621,996 | 11/1986 | Hundley, III | 425/67 X |
| 4,663,099 | 5/1987 | Marven | 264/142 |

Primary Examiner—Richard L. Chiesa
Attorney, Agent, or Firm—Varndell Legal Group

[57] ABSTRACT

The present invention is directed to a whirlpool type high speed cooler comprising a cooling cylinder having a bottom drain hole. An upper chamber, a circular channel and a cooling chamber are provided within the cooling cylinder by plurality of plates. The circular channel is capable of forming a column of cooling water about the inner walls of the cooling chamber and has holes and guide plates adjacent to the inner wall cooling cylinder for this purpose. A convex head drum extending laterally at upper portion of the cooling chamber is provided for guiding water into the circular channel through the holes and against the guides in the circular channel thereby creating a whirlpooling column of cooling water about the inner wall of the cooling chamber. A revolving plate located in the cooling cylinder has a plurality of inclined cutter blades at its circumference. A mold is arranged in the upper chamber of the cooling chamber and abuts the revolving plate. The whirlpool high speed cooler is arranged so that plastic is fed into the mold and is cut into grains, and the grains are forced towards and mixed with the whirlpooling of columnar cooling water about the inner wall of the cooling cylinder and then washed out of the cooling cylinder through the drain hole.

1 Claim, 3 Drawing Sheets

WHIRLPOOL TYPE HIGH SPEED COOLER FOR PLASTIC GRAINS

BACKGROUND AND SUMMARY OF THE INVENTION

The cooling method used in a conventional plastic grains making machine exposes the plastic grains to air for cooling. However, when the plastic grains are discharged from the machine, they are very hot and can not be easily cooled within a short period of time by the air cooling method. Thus, the plastic grains so produced may adhered together into a mass. With plastic materials of high viscosity, the situation is worse, and the plastic materials so produced may not be able to form into grains. Therefore, the method of self cooling in air can not provide a sufficient cooling effect, and more, particularly, in high speed methods, the quality is difficult to control. In order to provide a better cooling effect, an improved water cooling system is adopted currently. The present invention uses a water cooling system in plastic grains making, which provides the following features:

1. By means of cutter blades, plastic materials are cut into grains and the grains are pushed to the inner wall to mix with a whirlpooling column of cooling water, in order to increase the cooling surface of the grains with the cooling water so as to provide a quick and complete cooling effect.

2. The cutter blades are arranged around the circumference of a revolving plate, so that when the plastic materials pass through escape holes in the mold, they are quickly cut into grains by means of the rotation of the revolving plate which increases productivity with improved quality.

3. The plastic grains are fully mixed with the whirlpooling column of cooling water to speed up the cooling effect and are washed out through a drain hole together with the cooling water to prevent any sticking of grains.

DETAILED DESCRIPTION OF THE PREFERRED EMBODIMENT

Figure 1:
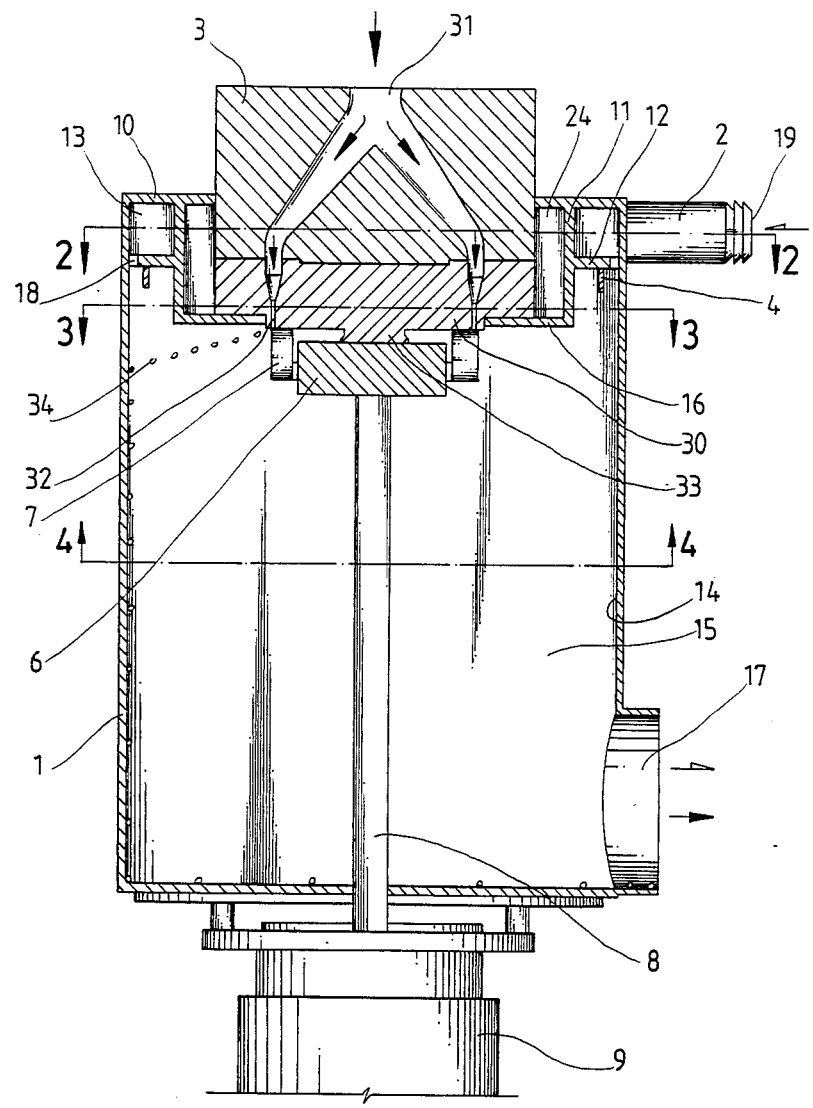
FIG. 1 is a front sectional view of a cooler embodying the present invention.
Figure 3:
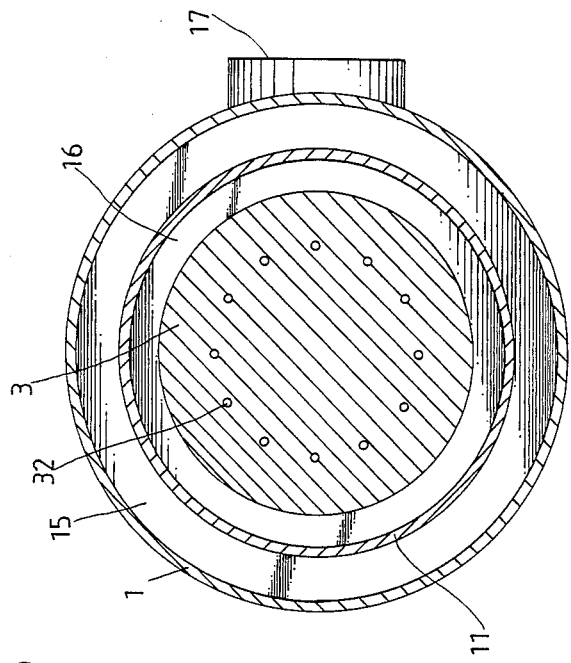
FIG. 3 is a sectional view taken along line 3—3 of FIG. 1.
Figure 2:
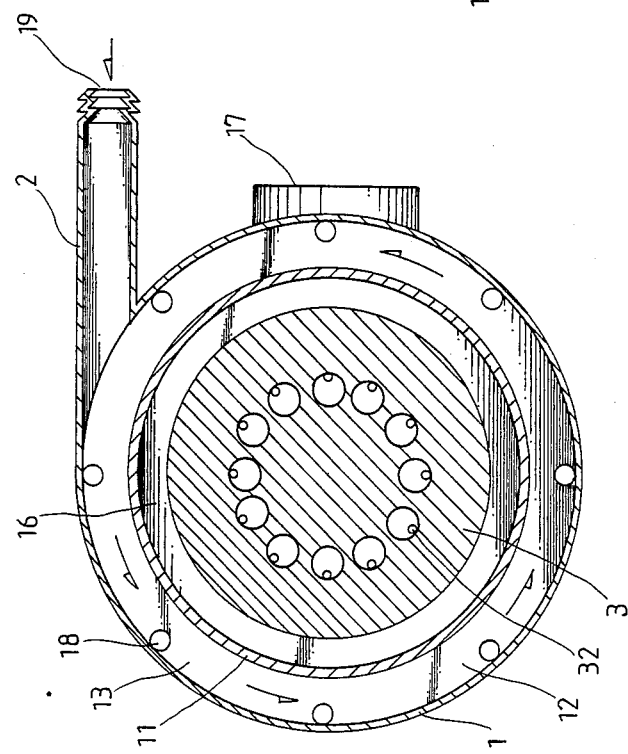
FIG. 2 is a sectional view taken along line 2—2 of FIG. 1.
Figure 4:
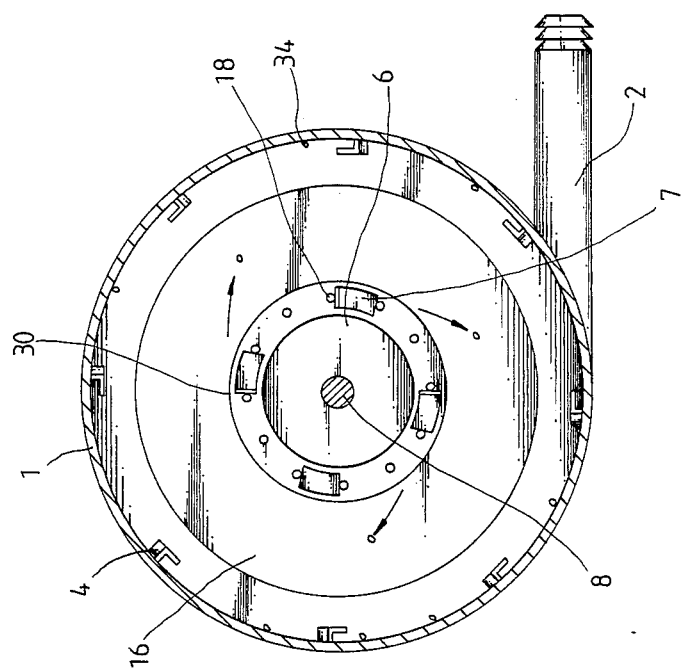
FIG. 4 is a sectional view taken along line 4—4 of FIG. 1.

The cooler according to the present invention, as shown in FIGS. 1, 2, 3 and 4, is mainly a cooling cylinder 1 having an upper division plate 10 connected with a lower division plate 16 by means of a vertical division plate 11. An intermediate circular division plate 12 is arranged around the middle part of the vertical division plate 11 and connected to the inner wall 14 of the cooling cylinder 1 to form an upper chamber 24, a circular channel 13 and a cooling chamber 15. The upper division plate 10 and lower division plate 16 comprise respective round holes at the center, the round hole of the lower division plate 16 is relatively smaller an receives an inner mold it to penetrate 30 of the mold 3, in a manner allowing into the cooling chamber 15 through the round hole of the lower division plate 16. The mold 3 comprises an inlet 31 for feeding of plastic materials, and manifolds or various material escape holes 32. A protruding portion or head 33 of the inner mold 3 of mold 3 abuts the upper surface of a revolving plate 6. The revolving plate 6 comprises a plurality of cutter blades 7 arranged in an inclined position around the escape holes 32 and is connected to a motor 9 out of the cooling cylinder 1 by means of a driving shaft 8, such that the rotation of the motor causes the revolving plate 6 to rotate. The cooling cylinder 1 also comprises a drain hole 17 at its lower portion for discharge of cooling water and materials. Further, various pierced round holes 18 are arranged at the connecting part between the intermediate circular division plate 12 and the inner wall 14. An inclined water guide plate 4 is arranged inside the cooling chamber 15 below the round holes 18 for guiding the cooling water and creating a whirlpooling column of cooling water.

Please refer to FIGS. 1, 2, 3 and 4 again, when cooling water runs through the water inlet 19 of the convex head drum 2 into the circular channel 13, it quickly enters the cooling chamber 15 through the round holes 18, as shown in FIG. 4. The cooling water runs downward around the inner wall 14 of the cooling cylinder 1 by means of the inclined water guide plate 4, thereby creating a whirlpooling column of cooling water. At this time, the plastic raw materials are fed into the mold through the inlet 31, and the materials are then guided to the various escape holes 32. By means of the rotation of the revolving plate 6, the cutter blades 7 arranged around the revolving plate 6 are turned into an inclined position and cut the plastic strips into plastic grains 34. Thereafter, the plastic grains 34 are pushed by means of the revolving force of the cutter blades and fall toward the inner wall 14 of the cooling chamber 1 and mix with the whirlpooling column of cooling water. Finally, the grains 34 and the mixed cooling water are washed out of the cooling chamber 1 through the drain hole 17 to complete the cutting and cooling process.

I claim:

1. A whirlpool high speed cooler comprising a cooling cylinder, said cooling cylinder having a bottom drain hole, an upper division plate connected to a lower division plate by a vertical division plate, each of said upper and lower division plates having a hole for receiving a mold, said vertical division plate being connected to an inner wall of the cooling cylinder by an intermediate circular division plate and forming an upper chamber, a circular channel and a cooling chamber, said intermediate circular division plate having means for forming a whirlpooling column of cooling water about said inner wall of the cooling chamber including holes at its periphery adjacent said inner wall of said cooling cylinder and guide plates at each said hole, said cooling cylinder further comprising an extended convex head drum extending laterally at an upper portion of said cooling cylinder for guiding water into said circular channel through said holes and against said guides in said intermediate circular division plate and for forming said whirlpooling column of cooling water about said inner wall of the cooling chamber, a revolving plate located within said cooling cylinder and connected to a motor located beneath said cooling cylinder by a driving shaft penetrating through said cooling chamber of the cooling cylinder, said revolving plate having a plurality of inclined cutter blades at its circumference, said mold having an inner mold with a protruding head for providing a spacing between escape holes of said mold and said cutter blades of said revolving plate, said mold being inserted into said holes of said upper and lower division plates so that said protruding head of said inner mold abuts an upper portion of said revolving plate, wherein said whirlpool high speed cooler is arranged so that plastic is fed into said mold and exits said mold at said escape holes in strips and rotation of said revolving plate cuts said plastic strips into plastic grains and forces the plastic grains to fall toward and mix with said whirlpooling column of cooling water about said inner wall of said cooling cylinder and then washed out of the cooling cylinder through said drain hole.

* * * * *